United States Patent [19]
El-Haj

[11] Patent Number: 6,051,814
[45] Date of Patent: Apr. 18, 2000

[54] CIGAR LIGHTER WITH PTC THERMAL PROTECTION

[75] Inventor: Ali El-Haj, Trumbull, Conn.

[73] Assignee: Casco Products Corporation, Bridgeport, Conn.

[21] Appl. No.: 09/114,614

[22] Filed: Jul. 13, 1998

[51] Int. Cl.[7] .................................................. F23Q 7/00
[52] U.S. Cl. ........................ 219/264; 219/262; 219/263; 219/265; 219/264; 219/267; 219/270
[58] Field of Search .................................. 219/264, 262, 219/263, 265, 267, 270

[56] References Cited

U.S. PATENT DOCUMENTS

| | | | |
|---|---|---|---|
| Re. 26,316 | 12/1967 | Horwitt | 219/265 |
| 2,210,025 | 8/1940 | Cohen | 219/32 |
| 2,224,034 | 12/1940 | Lehmann | 219/32 |
| 2,248,402 | 7/1941 | Conboy | 219/32 |
| 2,256,876 | 9/1941 | Wolfson | 219/32 |
| 2,262,484 | 11/1941 | Bahr | 219/32 |
| 2,883,510 | 4/1959 | Krautwurst et al. | 219/32 |
| 3,012,120 | 12/1961 | Gaudet | 200/116 |
| 3,238,353 | 3/1966 | Lybrook | 219/265 |
| 3,424,414 | 1/1969 | Horwitt | 248/27 |
| 3,462,721 | 8/1969 | Boudreau | 337/75 |
| 3,532,849 | 10/1970 | Horwitt | 219/265 |
| 3,818,179 | 6/1974 | Mase | 219/267 |
| 3,863,047 | 1/1975 | Mase | 219/265 |
| 3,870,857 | 3/1975 | Horwitt et al. | 219/267 |
| 3,892,944 | 7/1975 | Horwitt et al. | 219/270 |
| 3,904,848 | 9/1975 | Horwitt et al. | 219/267 |
| 4,011,000 | 3/1977 | Wharton | 339/130 |
| 4,058,701 | 11/1977 | Gruber | 219/270 |
| 4,130,815 | 12/1978 | Horwitt et al. | 338/282 |
| 4,207,455 | 6/1980 | Horwitt et al. | 219/265 |
| 4,267,430 | 5/1981 | Downey | 219/222 |
| 4,327,401 | 4/1982 | Silberg | 362/183 |
| 4,456,817 | 6/1984 | Mehnert et al. | 219/263 |
| 4,498,726 | 2/1985 | Mattis | 339/182 R |
| 4,544,226 | 10/1985 | Lupoli | 339/130 R |
| 4,650,962 | 3/1987 | Pramaggiore | 219/264 |
| 4,713,733 | 12/1987 | Fitz et al. | 362/80 |
| 5,030,811 | 7/1991 | von Gaisberg et al. | 219/268 |
| 5,116,233 | 5/1992 | Croce | 439/161 |
| 5,233,162 | 8/1993 | von Gaisberg et al. | 219/265 |
| 5,403,996 | 4/1995 | Mattis | 219/265 |
| 5,493,098 | 2/1996 | Diederich | 219/265 |
| 5,498,855 | 3/1996 | Deevi et al. | 219/553 |
| 5,606,483 | 2/1997 | Sawai et al. | 361/106 |

FOREIGN PATENT DOCUMENTS

| | | |
|---|---|---|
| 0511089 | 4/1992 | European Pat. Off. . |
| 0495720A1 | 7/1992 | European Pat. Off. . |
| 495720 | 7/1992 | European Pat. Off. . |
| 929562 | 6/1955 | Germany . |
| 393602C1 | 4/1990 | Germany . |
| 2099122 | 1/1982 | United Kingdom . |

Primary Examiner—Teresa Walberg
Assistant Examiner—Vinod D Patel
Attorney, Agent, or Firm—Mitchell D. Bittman; K. Gibner Lehmann

[57] ABSTRACT

An electric cigar lighter includes a receptacle for receiving and energizing an igniting unit of an automatic electric cigar lighter, the receptacle having a pair of circuits having respectively a grounding contact and a polarizing contact both of which are engageable with the igniting unit to carry current thereto, and a heat-responsive device comprising a solid state positive temperature coefficient resistor disposed in series in one of the circuits, the resistor being adapted to receive heat from the igniting unit for limiting the current in the one circuit when the resistor attains a predetermined high temperature.

2 Claims, 3 Drawing Sheets

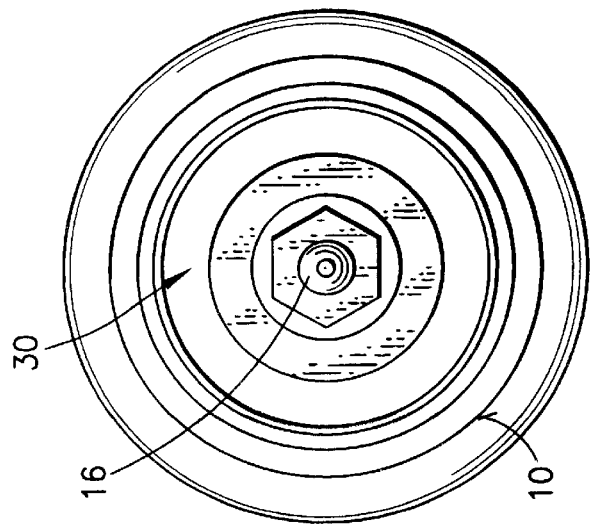
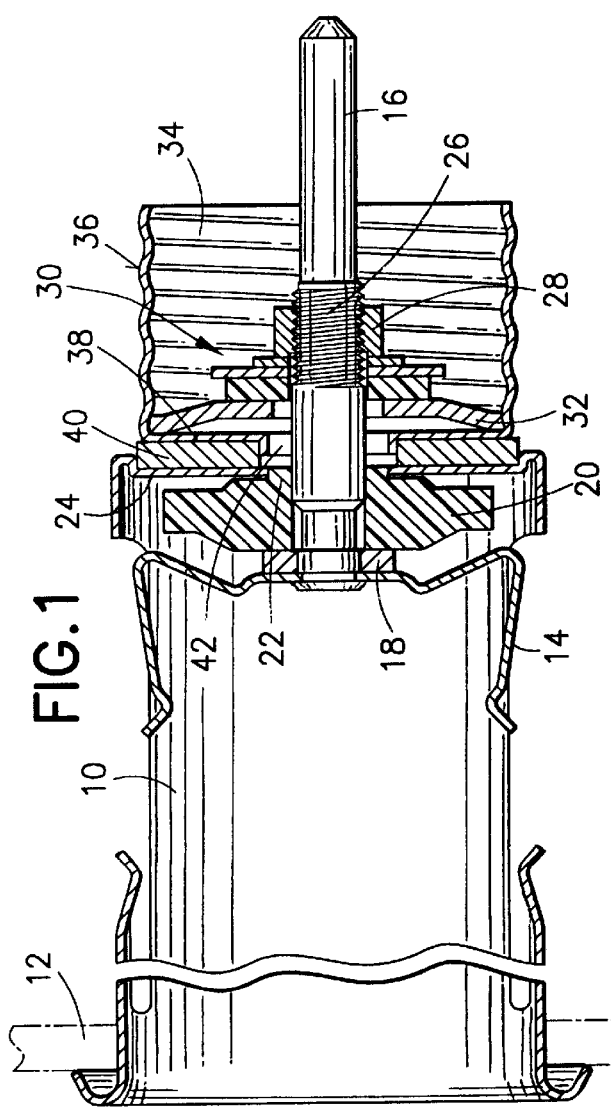
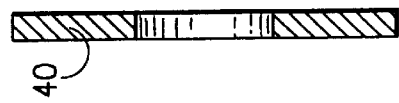
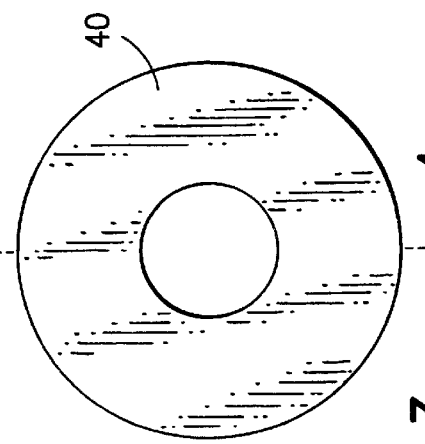

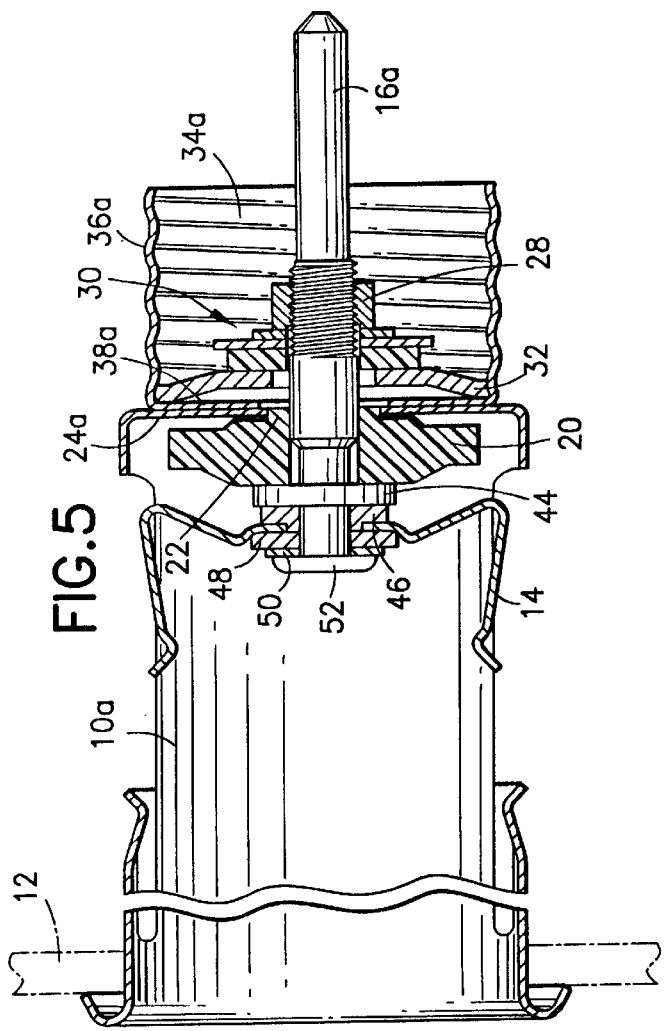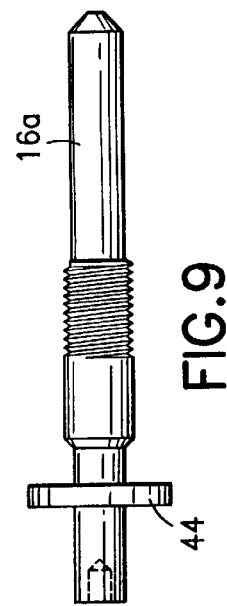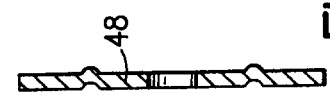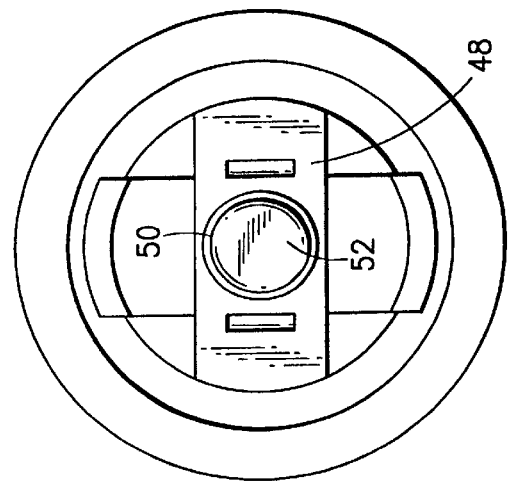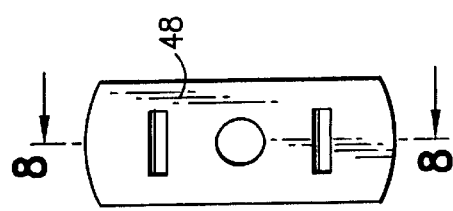

CIGAR LIGHTER WITH PTC THERMAL PROTECTION

NO CROSS REFERENCES TO RELATED APPLICATIONS/PATENTS

STATEMENT AS TO RIGHTS TO INVENTIONS MADE UNDER FEDERALLY-SPONSORED RESEARCH AND DEVELOPMENT

Research and development of the present invention and application have not been Federally-sponsored, and no rights are given under any Federal programs.

BACKGROUND OF THE INVENTION

1. Field of the Invention

This invention relates to electric cigar lighters, and more particularly to cigar lighters of the type which have automatic means for controlling the energizing current for the heating element.

2. Description of the Related Art Including Information Disclosed Under 37 CFR 1.97–1.99

The present invention more particularly concerns improvements in the cigar lighters that are illustrated and described in U.S. Pat. No. 4,544,226 dated Oct. 1, 1985 and entitled TWO-PIECE CLAMP SHELL FOR ELECTRIC CIGAR LIGHTER; U.S. Pat. No. 4,130,815 dated Dec. 19, 1978 and entitled FORMED HEATING RIBBON AND COIL; U.S. Pat. No. 3,909,587 dated Sep. 30, 1975 and entitled SPIRAL WOUND ELECTRICAL HEATING ELEMENT; U.S. Pat. No. 3,904,848 dated Sep. 9, 1975 and entitled CIGAR LIGHTER IGNITING UNIT; and in U.S. Pat. No. 3,532,849 dated Oct. 6, 1970 and entitled BIMETAL SHUNT FOR ELECTRIC CIGAR LIGHTER. The disclosures of these prior patents are included in the present application by way of reference.

The present invention also concerns improvements in the cigar lighters described and claimed in application U.S. Ser. No. 08/289,121 filed Aug. 11, 1994 and entitled ELECTRIC CIGAR LIGHTER HAVING COMBINED ASSEMBLER AND CONNECTOR PLUG AT ITS REAR, now U.S. Pat. No. 5,493,098 dated Feb. 20, 1996, which has common ownership with the above-identified patents. The disclosure of U.S. Pat. No. 5,493,098 is hereby incorporated, by reference, into the present application.

For many years automatic electric cigar lighters for automobiles have incorporated a bimetallic clip or latch in a panel-mounted receptacle or socket, such clip being adapted to latch onto a metal cup carried by a removable igniting unit. The metal cup contained a spiral-coiled heating element which, when energized to red heat, would heat and spread the bimetallic clip, releasing the igniting unit for removal from the socket. The heated element was then accessible and ready to be contacted by the tip of the cigar or cigarette to ignite the same.

Various safety measures were proposed to insure against malfunction and possible fire in such lighters. In U.S. Pat. No. 3,532,849 a second bimetallic member was for the first time introduced and arranged in the circuit so as to intentionally short-circuit the lighter and cause a line fuse at another location to blow out, usually such other location being a fuse block for the various car circuits.

U.S. Pat. No. 3,904,848 disclosed cost-cutting features in a cigar lighter, coupled with greater reliability of the igniting unit, to bring down the overall cost of the lighter and also to provide for a reliable replacement of the igniting unit.

In U.S. Pat. No. 3,909,587 improvements were made in the configuration of the heating element ribbon, to obtain a greater heat density and better stability and ruggedness, as well as reductions in cost.

U.S. Pat. No. 4,130,815 disclosed a different, unique heating coil configuration which made the coil more rugged and durable, as well as providing an improved heat density characteristic.

In U.S. Pat. No. 4,544,226 an improved sheet metal receptacle was proposed, which eliminated deep-draw operations and reduced the cost still further.

Still other improvements sought to attain better operation by modifications of the current control devices or bimetal switches that responded to the heat of the heating element, as well as better safety and maintenance of the lighter.

The various prior current-control devices mostly involved movable components such as bimetallic arms, clips, switch elements and the like, involving undesirable precise assembly operations and adjustments, circuit breaking arcs, radiation spikes and noises, and deterioration of contact surfaces, etc.

SUMMARY OF THE INVENTION

The present invention obviates the above drawbacks and disadvantages of prior automatic electric cigar lighters, and one object of the invention is to provide an improved automatic electric cigar lighter having a unique safety current control means which is especially simple and low in cost.

Another object of the invention is to provide an improved electric cigar lighter as above set forth, which is characterized by a current controller that is devoid of moving parts of any kind whatsoever, with their attendant disadvantages.

A further object of the invention is to provide an improved current control in an electric cigar lighter as above set forth, which is fully repeatedly automatic in its operation.

Still another object of the invention is to provide an improved current control as characterized above, which is not critical in its operation, is reliable in use, and adaptable to various different requirements of equipment in which it is to be used.

Yet another object of the invention is to provide an improved cigar lighter current control, which provides an advantageous recurring safety factor in the operation of the lighter.

An additional object of the invention is to provide an improved cigar lighter control in accordance with the foregoing, which is small in size and compact, and not subject to excessive heating when in operation.

Other features and advantages will hereinafter appear.

In carrying out the above objects, the invention provides in an electric cigar lighter, a receptacle providing a pair of circuit means for the igniting unit, including a grounding circuit contact and a "hot" or polarizing circuit contact, together with an additional, unique heat-responsive means that is inserted in series in one of said circuits, said means being in the form of a positive temperature coefficient or PTC resistor that consists of a conductive polymer constituted as a solid state device that is devoid of moving parts. In one embodiment of the invention, the said heat-responsive means is disposed closely adjacent to and along the working face of the heating element of the igniting unit, thereby to insure an efficient transfer of heat therebetween.

BRIEF DESCRIPTION OF THE DRAWINGS

In the accompanying drawings, showing several embodiments of the invention:

FIG. 1 is an axial sectional view of an automatic electric cigar lighter illustrating one embodiment of the invention.

FIG. 2 is an end elevational view of the back end of the lighter of FIG. 1.

FIG. 3 is a side elevational view of the PTC circuit control component of the lighter of FIG. 1.

FIG. 4 is a sectional view taken on the line 4—4 of FIG. 3.

FIG. 5 is an axial sectional view of an automatic electric cigar lighter illustrating another embodiment of the invention.

FIG. 6 is a front end elevational view of the lighter of FIG. 5.

FIG. 7 is a side elevational view of the PTC circuit control component of the lighter of FIG. 5.

FIG. 8 is a sectional view taken on the line 8—8 of FIG. 7.

FIG. 9 is a side elevational view of the central stud of the lighter of FIG. 5.

DESCRIPTION OF THE PREFERRED EMBODIMENTS

Figure 10:
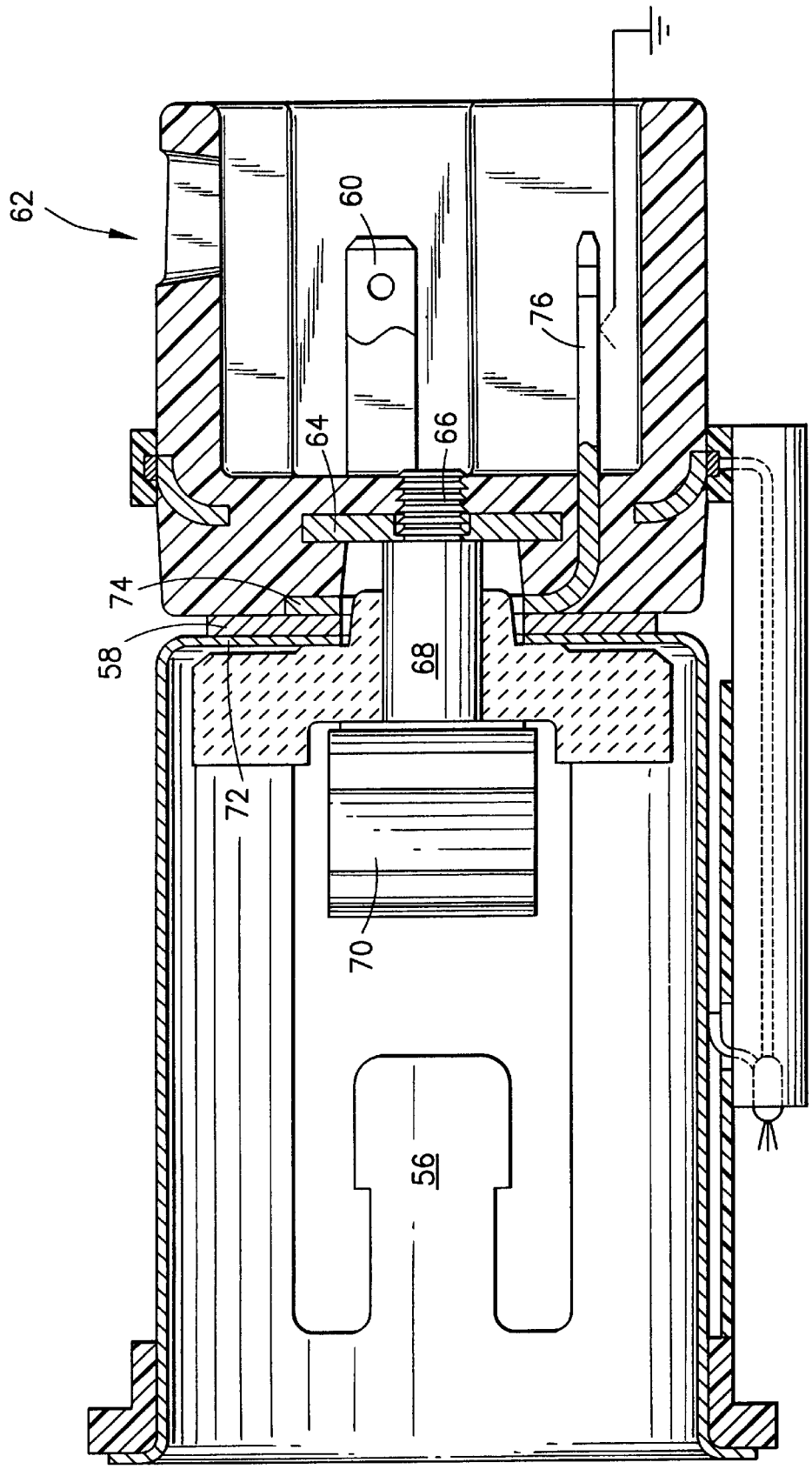
FIG. 10 is an axial sectional view of another embodiment of cigar lighter, having a push-to-assemble molded connector plug assemblage according to the invention.

The embodiment of the invention illustrated in FIGS. 1–4 will first be described. Cigar lighters of this type are commonly constructed to have a receptacle or socket which is adapted for mounting on an automobile dashboard, and a removable igniting unit or plug which is receivable in the socket and which has an electric heating element that receives current from the socket.

The present improved lighters of this invention are of this known general type as set forth in the above-identified patents, and accordingly the mentioned prior patented structures are incorporated in the disclosure of the present application by reference.

In FIG. 1 the receptacle or socket of the lighter is indicated by the numeral 10, with the mounting panel therefor shown in dotted outline and designated by the numeral 12. Igniting units for use with the socket 10 are not shown herein, since they, per se, form no part of the present invention.

Insulatedly carried in the socket 10 is a bimetallic spring clip 14 which is adapted to engage the metal rim (not shown) of the heating element cup of an electrical igniting unit. The clip 14 is mounted on the inner end of a central stud 16 which comprises the polarized contact of the socket, being adapted for connection to the "hot" circuit (not shown) of the automobile in the usual manner.

The stud 16 has a spacer washer 18 and passes through a ceramic insulating block 20 by which it is centralized in and insulated from the metal socket or shell 10. In effecting this, the block 20 has a flange 22 which fits into a central aperture of the rear wall 24 of the socket 10.

The stud 16 has screw threads 26 which carry an hexagonal nut 28 that clamps an insulating group of three washers 30 which bear against a resilient metal washer 32.

A usual type of clamping fitting or contact 34 formed as a drawn metal cup with rolled threads 36 and transverse end wall 38 is secured in place at the end wall 24 of the socket, by virtue of the end wall 38 being engaged by the resilient washer 32.

The washer group 30 insulates the resilient washer 32 from the stud 16, as will be understood and as shown. In securing the socket 10 to the panel 12, a clamping shell (not shown) is threaded onto the clamping fitting 34, being adapted to engage the rear surface of the electrically insulating plastic panel 12.

As above set forth and according to the present invention, the clamping fitting 34 is electrically insulated from the stud 16 and also is not in contact with the socket 10. In prior cigar lighters the clamping fitting 34 has had good electrical contact with the socket 10, these components normally constituting the grounding circuit or the ground contact of the socket.

However, in accordance with the present invention, a novel and unique circuit control is now provided between the fitting 34 and the wall 24 of the socket 10, which control functions to limit the operating current in the event of any overheating of the heating element of the igniting unit.

As shown in FIGS. 1–3, this automatic control comprises an apertured slab or washer 40 which is characterized as a conductive polymer PTC resistor having the form of a solid state device with no moving parts, but which instead has a well established and relatively stable positive temperature coefficient of resistance. As seen in these figures, the slab 40 is in the form of a flat washer which surrounds the stud 16 but does not touch the same, and which is interposed between the rear wall 24 of the socket 10 and the transverse wall 38 of the clamping fitting 34, being in good electrical contact with both of these walls.

The transverse wall 24 of the socket is recessed to enable the PTC washer 40 to be nested and centralized therein. Also, the wall 38 of the fitting 34 is drifted at its center to form a flange 42 which is received in the inner periphery of the PTC washer 40 for centralizing purposes, and this also effects a centralizing of the resilient biasing washer 32. Thus various components at the stud 16 are maintained centralized and out of contact with the stud where necessary.

By the above construction, the PTC washer 40 has been interposed in the grounding circuit of the socket 10, between the clamping fitting or contact 34 on the one hand and the socket ground contact 10 on the other hand. The PTC washer 40, however, is subject to heating by the igniting unit (not shown) which is being gripped by the bimetallic fingers or clip 14. If overheating of the cigar lighter should occur, the PTC element will respond by a large increase in its resistance, thereby to limit the energizing current and reduce the heating to a greatly reduced value.

As soon as the heating of the cigar lighter becomes reduced again to a normal value or to cooling, the consequent cooling of the PTC element will result in a decrease in its ohmic value whereupon the energizing current can correspondingly increase to essentially its normal value. If the condition which caused the overheating still exists, the above cycle will be repeated, and will continue until the cause is remedied.

In this respect the insertion of the PTC washer 40 in the circuit will produce a re-cycling effect much like that of a bimetallic re-cycling switch in the circuit. However, the heating effect at the point where the circuit is being controlled will be less, with no arcing and with a much greater economy of space and cost.

Conductive polymer PTC resistors in the form of solid state devices are available commercially.

Another embodiment of the invention is illustrated in FIGS. 5–9, wherein the "hot" or polarized circuit means of the cigar lighter socket is interrupted and has interposed in it a current limiting PTC resistor, as distinguished from the embodiment of FIGS. 1–4 wherein the PTC resistor is interposed in the electrical ground circuit means of the socket.

In FIG. 5 the socket 10a, mounted on panel 12, has a clamping fitting 34a which is clamped against the socket wall 24a under bias from the resilient washer 32 and nut 28 on stud 16a, so as to constitute an uninterrupted ground circuit and contact of the lighter by the socket 10a and clamping fitting 34a.

The stud 16a differs from the stud 16 of FIG. 1 in that it has an integral circular flange 44 which is engaged with the ceramic block 20 that is centralized with respect to the wall 24a of the socket 10a.

In accordance with the invention, the bimetallic clip 14 is insulatedly mounted on the stud 16a by means of a shouldered ceramic washer 46, and is electrically connected and clamped to the stud through a PTC conductive polymer resistor strip 48 which in turn is affixed to the stud 16a by a metal washer 50 and the mushroomed end 52 of the stud.

The stud 16a and the clip 14 constitute contacts of the interrupted polarized circuit means of the socket 10a, such means being interrupted by the PTC strip 48 which now limits the heating current that can be supplied to the igniting unit (not shown). It is to be noted that the PTC strip 48 is much closer to the heating element which the usual igniting unit mounts, since such units have their heating coils wound spiral-fashion in shallow metal cups which are to be gripped by the bimetallic clip 14, all as is well understood in the art.

It can now be understood that the response of the PTC strip 48 to heat resulting from the energization of the cigar lighter will be much faster than the response of the PTC washer 40 of the embodiment of FIG. 1, since the washer 40 is exterior to the wall 24 of the socket whereas the strip 48 is inside the socket, disposed forwardly of the ceramic block or mount 20.

By virtue of such location of the PTC strip 48, a surprisingly new operation of the lighter can be had by effecting an alteration of some of the circuit components in the heating element energizing circuit, thereby to obtain a much speedier heating of the igniting unit. For example, if the ohmic resistance of the heating element of the igniting unit were to be reduced, this would result in a greater energizing current and a faster heating of the lighter. The heating speed could approach a very high value, so that the lighter might be thought of as an "instantaneous lighter". Burnout of the igniting unit would be prevented, however, by the automatic current-limiting action of the faster-acting PTC strip 48.

A similar effect would be obtained theoretically by merely increasing the voltage applied between the stud 16a and the socket 10a, as will be understood.

As an alternative or in addition to the above, the response time of the bimetal clip 14 could be made faster, or in other words, shortened by choice of different metals and thicknesses in its makeup, whereby part of the normal timing of the lighter would be assumed by the PTC strip 48 to protect the integrity of the igniting unit heating element. Thus a beneficial shortening of the heating time of the igniting unit could be effected in this manner, also.

The circuit control and cycling of the embodiment of FIG. 5 in response to overheating of the cigar lighter is in other respects generally similar to the explanation given above in connection with the embodiment of FIG. 1.

Another embodiment of the invention is illustrated in FIG. 10, which shows a cigar lighter of the type disclosed in U.S. Pat. No. 5,493,098 above referred to. In this figure the socket member or receptacle shell 56 constituting the ground circuit of the lighter carries at its rear a temperature-sensitive or PTC circuit control washer 58 which is included in the ground circuitry of the lighter to function if an overheat condition should occur.

The "hot" circuit of the lighter in FIG. 10 comprises a spade-type terminal or lug 60 which is insulatedly carried by and molded into a push-to-assemble plastic connector plug body 62. The lug 60 has a circular apertured base portion 64 which is pressed or pushed onto the barbed portion 66 of the central assembly stud or shank 68 of the lighter, and the stud 68 carries the usual bimetallic spring clips 70 for engagement with the heating element (not shown) of the igniting unit of the lighter.

The ground circuit of the lighter comprises the socket or shell 56 having a transverse rear wall 72 which is forcibly held in intimate contact with the PTC temperature responsive washer 58 by the connector plug assemblage 62. The washer 58 in turn is forcibly held in contact with the base 74 of the grounding prong 76 that is located within the plug body 62 with its base 74 molded therein.

In this embodiment of the invention the PTC washer 58 replaces the bimetallic arm of the prior patent, and effects a simpler construction of the lighter, with fewer components. Operation is in most respects similar to the operations described above, for the preceding embodiments.

Each and every one of the appended claims defines an aspect of the invention which is complete in and of itself, separate and distinct from all others, and accordingly it is intended that each claim be treated in this manner when examined in the light of the prior art devices, in any determination of novelty or validity.

Variations and modifications are possible without departing from the spirit of the invention, and portions of the improvements can be used without others.

What is claimed is:

1. An electric cigar lighter comprising, in combination:
   a) a metal socket constituting a well for receiving a cigar lighter ignitor plug,
   b) said socket having an apertured rear wall,
   c) a conductive metallic threaded stud insulatedly carried by said socket, said stud having a rear portion extending through the aperture of the rear wall of the socket,
   d) an electrically-conductive cup-like screw shell having a bottom wall with an aperture through which the stud extends, said screw shell having a centralizing flange surrounding said aperture thereof, and further including a nut screwed on the threaded portion of the stud and a bowed washer carried on the stud beneath the nut, so as to mechanically secure the screw shell in a fixed position at the rear wall of the socket and with the cup-like configuration of the screw shell facing in a direction away from the socket,
   e) rearmost portions of said stud projecting from the open end of the screw shell and being electrically insulated therefrom,
   f) a positive temperature coefficient washer sandwiched between and having opposite faces that are respectively, electrically contacting the rear wall of the socket and the bottom wall and said centralizing flange of the screw shell, to form an electrical series connection, from the bottom wall of the screw shell, through said positive temperature coefficient washer, and to the electrically conductive rear wall of the socket, whereby as the electrical resistance of the positive temperature coefficient washer increases with increases with temperature, there occurs a corresponding increase in the resistance of the series connection between said screw shell and the socket, so as to limit the current flow through the series connection to a safe value.

2. An electric cigar lighter as set forth in claim 1, wherein:

a) the rear wall of the socket has an integrally-formed, rearwardly-facing circular recess in which the positive temperature coefficient washer is seated, whereby the washer remains centralized with respect to the axis of the socket.

\* \* \* \* \*